United States Patent
Gu et al.

(10) Patent No.: US 8,064,553 B2
(45) Date of Patent: Nov. 22, 2011

(54) COARSE FREQUENCY OFFSET ESTIMATION IN ISDB RECEIVERS

(75) Inventors: Yongru Gu, Lake Forest, CA (US); Jun Ma, Xian (CN)

(73) Assignee: Newport Media, Inc., Lake Forest, CA (US)

( * ) Notice: Subject to any disclaimer, the term of this patent is extended or adjusted under 35 U.S.C. 154(b) by 882 days.

(21) Appl. No.: 12/107,998

(22) Filed: Apr. 23, 2008

(65) Prior Publication Data

US 2009/0268850 A1    Oct. 29, 2009

(51) Int. Cl.
*H04L 27/06*    (2006.01)
(52) U.S. Cl. ..... 375/344; 375/260; 375/371; 455/182.2; 455/192.2
(58) Field of Classification Search ............ 375/145, 375/149, 260, 344, 354, 362, 364, 371; 370/503, 370/509, 510, 512, 514; 455/182.1, 182.2, 455/192.1, 192.2
See application file for complete search history.

(56) References Cited

U.S. PATENT DOCUMENTS

| 7,324,432 | B1 * | 1/2008 | Kim ........................... 370/208 |
| 7,643,566 | B2 * | 1/2010 | Hwang et al. ................ 375/260 |
| 2009/0097597 | A1 * | 4/2009 | Li et al. ....................... 375/344 |
| 2009/0290663 | A1 * | 11/2009 | Elsayed et al. .............. 375/344 |

* cited by examiner

*Primary Examiner* — Dac Ha
(74) *Attorney, Agent, or Firm* — Rahman LLC

(57) ABSTRACT

A method of estimating a coarse frequency offset in a receiver includes providing at least one candidate frequency offset in Orthogonal Frequency-Division Multiplexing (OFDM) symbols having transmission and multiplexing configuration control (TMCC) bins and auxiliary channel (AC) bins, modulating the TMCC bins and AC bins using differential binary phase shift keying (DBPSK) modulation, estimating a phase difference between a first symbol and a second symbol for the candidate frequency offset of the TMCC and AC bins to obtain a resulting phase difference, correcting the resulting phase difference based on a difference between the candidate frequency offset and a Fast Fourier Transform (FFT) center bin to obtain a corrected phase difference, mapping the corrected phase difference to numeric numbers, and adding the numeric numbers for the candidate frequency offset to obtain a summation result. The numeric numbers correspond to at least one of +1 or −1.

20 Claims, 8 Drawing Sheets

MAPPING PHASE DIFFERENCE TO EITHER 1 OR -1

MAPPING PHASE DIFFERENCE TO EITHER 1 OR -1

COARSE FREQUENCY OFFSET ESTIMATION IN ISDB RECEIVERS

BACKGROUND

1. Technical Field

The embodiments herein generally relate to wireless communication systems, and, more particularly, to coarse frequency offset estimation in wireless communication systems.

2. Description of the Related Art

Orthogonal Frequency Division Multiplexing (OFDM) is a digital multi-carrier modulation scheme, which uses a large number of closely-spaced orthogonal sub-carriers. OFDM, because of its multiple advantages (e.g., high spectrum efficiency, resistance against multi-path interference, and ease of filtering out noise, etc.), has been widely used in wireless transmission technology such as terrestrial digital broadcasting. In a digital broadcasting receiver design such as Integrated Services Digital Broadcasting-terrestrial (ISDB-T) and Integrated Services Digital Broadcasting—terrestrial digital sound broadcasting (ISDB-TSB), the major disadvantage for OFDM systems is its impairment due to coarse frequency offset.

Frequency offsets usually arise due to mismatched transmitter and receiver oscillators. The occurrence of a coarse frequency offset in the receiver causes a difference in the locations of the received data and control bins which are different from locations specified by the corresponding OFDM system standards. The location difference indicates the presence of coarse frequency offset. Hence, it is needed to estimate the coarse frequency offset and compensate it before receiving and decoding the received data. In an ISDB-T or ISDB-TSB OFDM symbol, there are data bins, pilot bins, transmission and multiplexing configuration control (TMCC) bins, and auxiliary channel (AC) bins.

The transmitted power on pilot, TMCC, and AC bins are 2.5 dB higher than that on the data bins. An approach for coarse frequency offset estimation based on the raised power property of pilot, TMCC, and AC bins is generally not reliable, especially when the channels are noisy and dynamic and there are echoes. In order to have an estimate of the coarse frequency offset before receiving and decoding the received data, a more reliable approach is desirable.

SUMMARY

In view of the foregoing, an embodiment herein provides a method of estimating a coarse frequency offset in a receiver. The method includes providing at least one candidate frequency offset in OFDM symbols having TMCC bins and AC bins, modulating the TMCC bins and AC bins using differential binary phase shift keying (DBPSK) modulation, estimating a phase difference between a first symbol and a second symbol for the candidate frequency offset of the TMCC and AC bins to obtain a resulting phase difference, correcting the resulting phase difference based on a difference between the candidate frequency offset and a Fast Fourier Transform (FFT) center bin to obtain a corrected phase difference, mapping the corrected phase difference to numeric numbers, and adding the numeric numbers for the candidate frequency offset to obtain a summation result. The numeric numbers correspond to at least one of +1 or −1.

The +1 may correspond to a phase difference between −45° and +45° and between 135° and 225°, and the −1 may correspond to a phase difference other than between −45° and +45° and 135° and 225°. The estimating process may be repeated to accumulate the summation result to obtain accumulation results for all candidate frequency offsets. The accumulation results may be compared for all candidate frequency offsets to obtain a maximum accumulation result. The receiver may include any of an ISDB-T and an ISDB-TSB receiver of transmission mode 2.

In another aspect, a method of estimating a coarse frequency offset in a receiver includes providing at least one candidate frequency offset in OFDM symbols having TMCC bins and AC bins, modulating the TMCC bins and AC bins using DBPSK modulation, estimating a phase difference between a first symbol and a second symbol for the candidate frequency offset of the TMCC bins to obtain a resulting phase difference, correcting the resulting phase difference based on a difference between the candidate frequency offset and a FFT center bin to obtain a corrected phase difference, determining a most likely common phase difference transmitted on the TMCC bins based on the phase difference, the TMCC bins carrying the same information and phase differences for all the TMCC bins are the same, subtracting the corrected phase difference by the common phase difference to obtain a new phase difference, the new phase difference may be zero, mapping the corrected phase difference to numeric numbers, and adding the numeric numbers for the candidate frequency offset for all the TMCC bins and the AC bins to obtain a summation result. The numeric numbers correspond to at least one of +1 or −1.

The +1 may correspond to a phase difference between −90° and +90°, and the −1 may correspond to a phase difference other than between −90° and +90°. The estimating process may be repeated to accumulate the summation result to obtain accumulation results for all candidate frequency offsets. The accumulation results may be compared for all the candidate frequency offset to obtain a maximum accumulation result. The receiver may include any of an ISDB-T and an ISDB-TSB receiver of transmission mode 3 with high Doppler and noisy channels.

Another embodiment provides an ISDB receiver that estimates a coarse frequency offset and includes means for capturing at least one candidate frequency offset in OFDM symbols having TMCC bins and AC bins, means for modulating the TMCC bins and AC bins using DBPSK modulation, a memory unit including a computer program set of instructions, a display unit operatively connected to the memory unit, and a processor adapted to execute the computer program set of instructions. The processor estimates a phase difference between a first symbol and a second symbol for the candidate frequency offset of the TMCC and AC bins to obtain a resulting phase difference, corrects the resulting phase difference based on a difference between the candidate frequency offset and a FFT center bin to obtain a corrected phase difference, maps the corrected phase difference to numeric numbers, and adds the numeric numbers for the candidate frequency offset to obtain a summation result. The numeric numbers correspond to at least one of +1 or −1.

The +1 may correspond to a phase difference between −45° and +45° and between 135° and 225°, and the −1 may correspond to a phase difference other than between −45° and +45° and 135° and 225°. The processor may repeat the estimating process to accumulate the summation result to obtain accumulation results for all candidate frequency offsets. The processor may compare the accumulation results for all candidate frequency offsets to obtain a maximum accumulation result.

The receiver may include any of an ISDB-T and an ISDB-TSB receiver of transmission mode 2. The processor may determine a most likely common phase difference transmitted on the TMCC bins based on the phase difference. The TMCC bins carrying the same information and phase differences for all the TMCC bins are the same. The processor may subtract the corrected phase difference by the common phase difference to obtain a new phase difference. The new phase difference may be zero. The processor may add the numeric numbers for the candidate frequency offset for all the TMCC bins and the AC bins to obtain a summation result.

The +1 may correspond to a phase difference between −90° and +90°, and the −1 may correspond to a phase difference other than between −90° and +90°. The receiver includes any of an ISDB-T and an ISDB-TSB receiver of transmission mode 3 with high Doppler and noisy channels.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
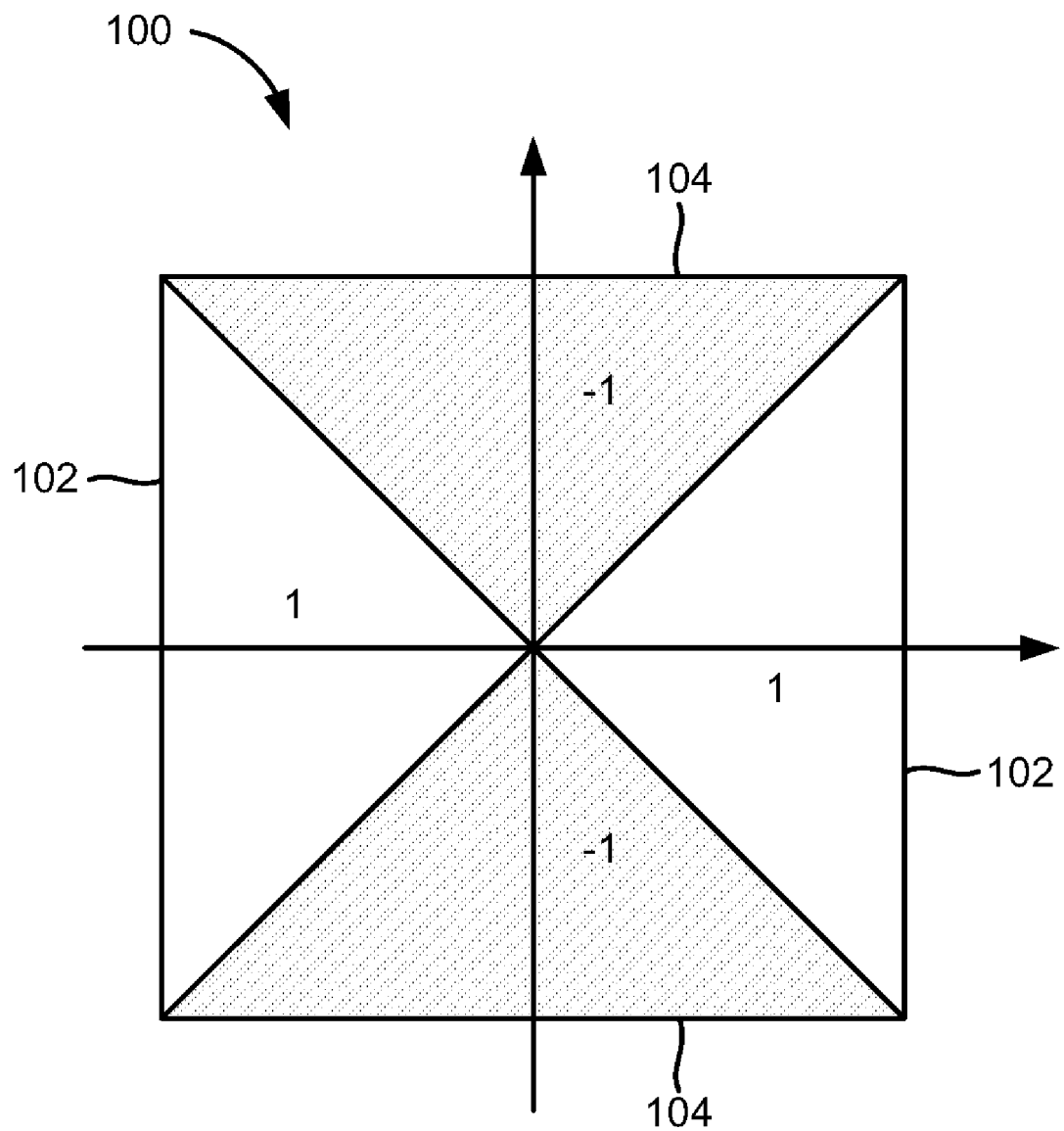
FIG. 1 is a graphical representation illustrating a mapping phase difference to either +1 or −1 for coarse frequency offset estimation in an ISDB receiver of transmission mode 2 according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 6, where similar reference characters denote corresponding features consistently throughout the figures, there are shown preferred embodiments. The embodiments herein provide approaches for coarse frequency offset estimation in ISDB-T and ISDB-TSB receivers, which utilize the unique properties of the TMCC and AC bins to lock the coarse frequency offset: the locations of TMCC and AC bins are unique, and these bins are DBPSK modulated.

In an ideal case, the phase across two adjacent symbols on a TMCC bin or AC bin is either 0° or 180°. Thus, the phase difference of the TMCC and AC bins are used to detect their location, and in turn, the coarse frequency offset. In order to have a reliable estimate of the coarse frequency offset before receiving and decoding the received data, an approach which utilizes the phase difference of DBPSK modulated TMCC and AC bins is implemented in an ISDB receiver.

FIG. 1 is a graphical representation illustrating a mapping phase difference 100 to either +1 or −1 for coarse frequency offset estimation in an ISDB receiver of transmission mode 2 according to an embodiment herein. FIG. 1 shows the mapped areas 102, 104. The mapped area 102 indicates that the phase difference value is between −45° and 45°, and between 135° and 225° and it corresponds to +1. The mapped area 104 indicates that the phase difference is a value other than between −45° and 45° and between 135° and 225° (e.g., a compensated phase difference) and it corresponds to −1. In one embodiment, the phase difference of two adjacent symbols difference for all TMCC and AC bins are computed and compensated based on the difference between the candidate frequency offset and a FFT center bin.

The compensated phase difference is mapped to +1 or −1 based on the phase difference. If a phase difference is between −45° and 45° and between 135° and 225°, the compensated phase difference is mapped to +1. The compensated phase difference is mapped to −1, if a phase difference is not between −45° and 45° and between 135° and 225°.

Figure 2:
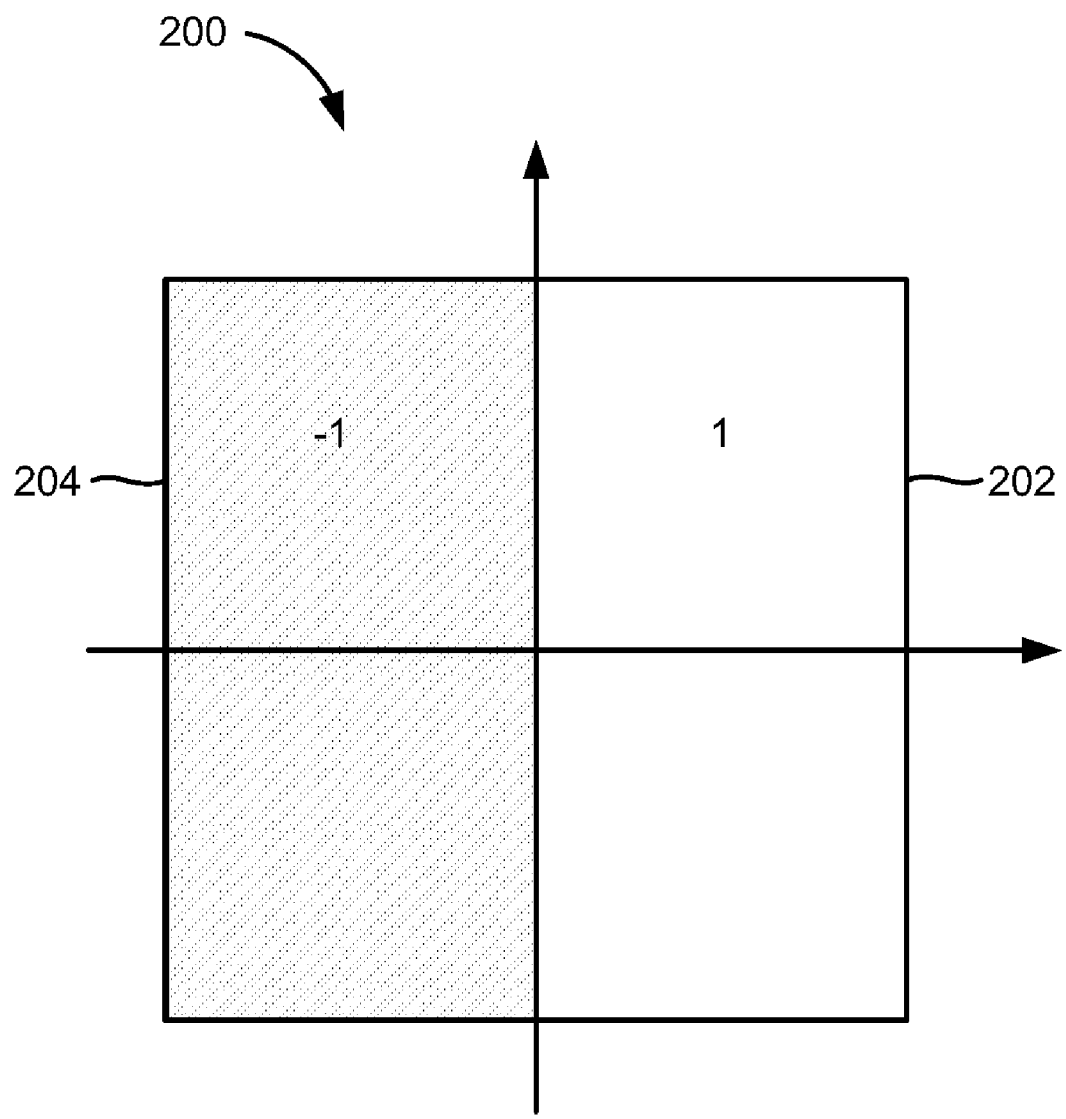
FIG. 2 is a graphical representation illustrating a mapping phase difference to either +1 or −1 for coarse frequency offset estimation in an ISDB receiver of transmission mode 3 according to an embodiment herein.

FIG. 2 is a graphical representation illustrating a mapping phase difference 200 to either +1 or −1 for a coarse frequency offset estimation in the ISDB receiver of transmission mode 3 according to an embodiment herein. FIG. 2 shows the mapped areas 202, 204.

The mapped area 202 indicates that the phase difference value is between −90° and 90° and it corresponds to +1. The mapped area 204 indicates the phase difference is a value other than between −90° and 90° and it corresponds to −1. In one embodiment, the phase difference of two adjacent symbols difference only for the corresponding TMCC bins are computed and compensated based on the difference between the candidate frequency offset and the FFT center bin. The compensated phase difference is subtracted by a common phase difference and is mapped to +1 or −1 based on the phase difference.

If a phase difference is between −90° and 90°, the compensated phase difference is mapped to +1. The compensated phase difference is mapped to −1, if a phase difference is not between −90° and 90°.

Figure 3A:
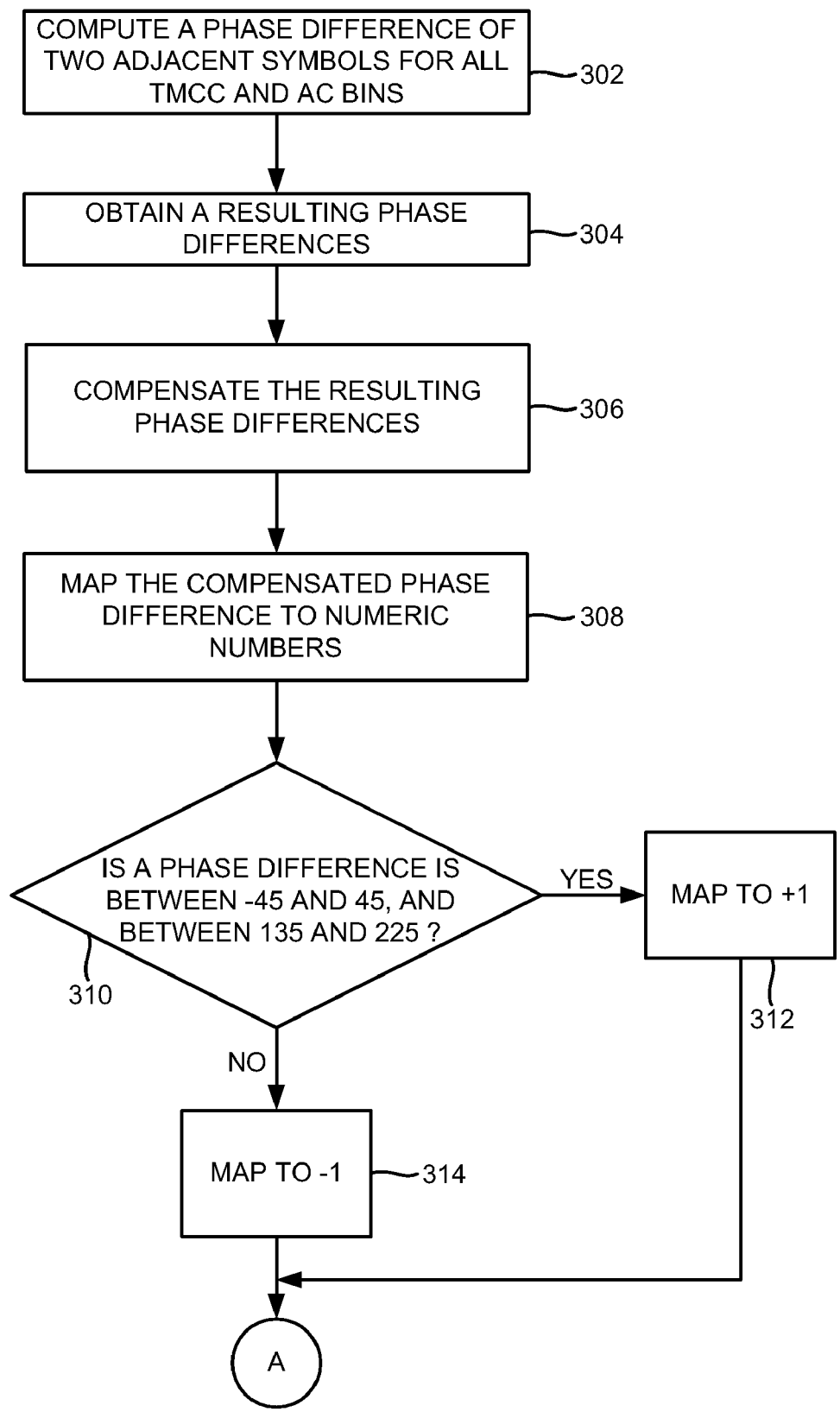
FIGS. 3A and 3B are flow diagrams illustrating a process of coarse frequency offset estimation in an ISDB receiver of transmission mode 2 according to an embodiment herein.
Figure 3B:
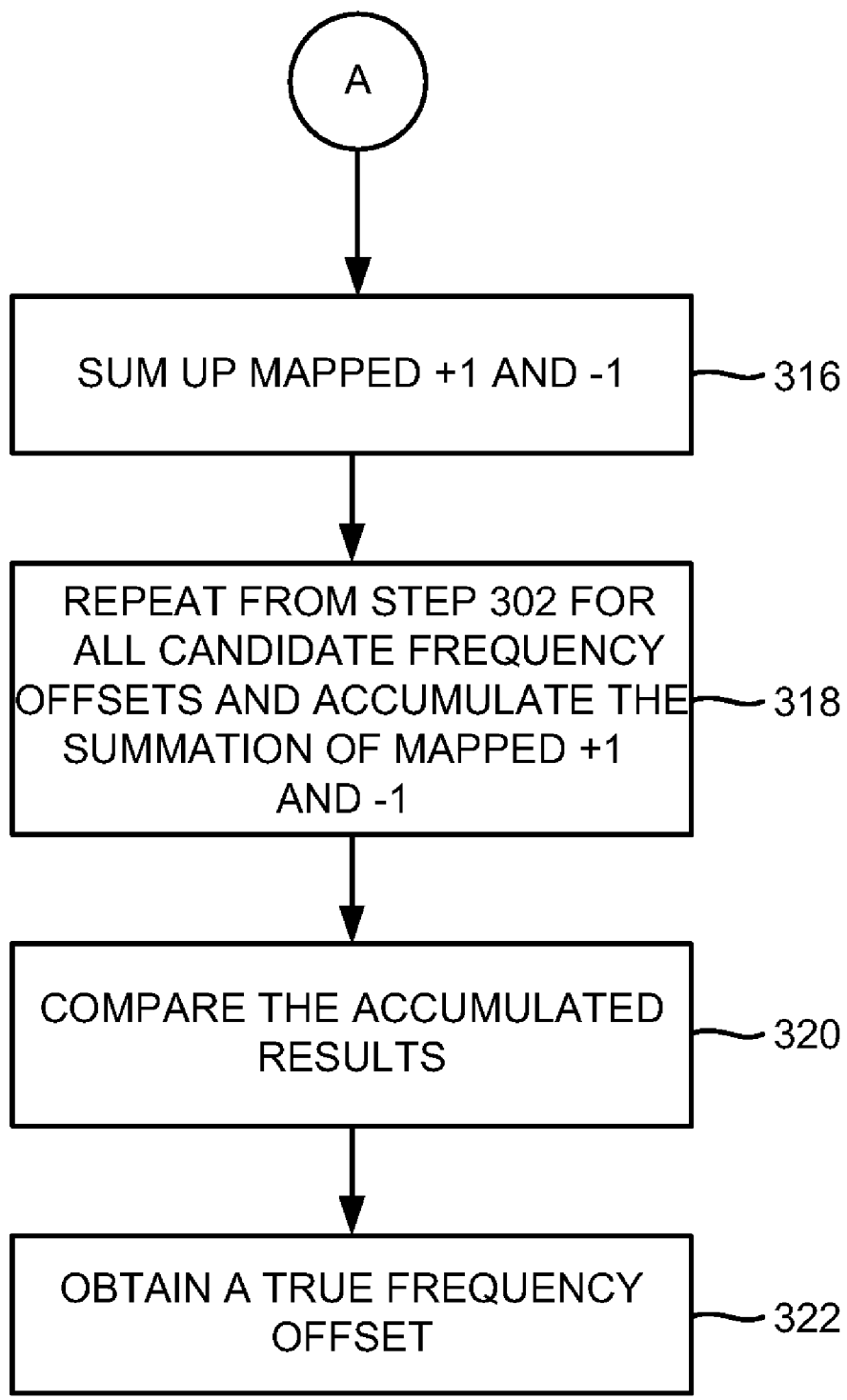

FIGS. 3A and 3B are flow diagrams illustrating a method of estimating a coarse frequency offset in an ISDB transmission mode 2 according to an embodiment herein. In step 302, for each candidate frequency offset, the phase difference of two adjacent symbols are computed for all corresponding TMCC and AC bins. In step 304, a resulting phase difference is obtained.

In step 306, the resulting phase differences are compensated based on the difference between the candidate frequency offset and the FFT center bin. In step 308, the compensated phase differences are mapped to some numeric numbers (either +1 or −1). In step 310, a condition is checked if a phase difference is between −45° and 45°, and between 135° and 225°. If the phase difference is between −45° and 45°, and between 135° and 225° (Yes), then the phase difference is mapped to +1 in step 312, else (No) the phase difference is mapped to −1 in step 314. In step 316, the mapped +1 or −1 for all the TMCC and AC bins for that candidate frequency offset are summed.

In step 318, the above steps from 302 are repeated for all candidate frequency offsets and the summation of the mapped +1 or −1 are accumulated. In step 320, the accumulated results are compared for each candidate frequency offset. In step 322, a true frequency offset is obtained. In one embodiment, the true frequency offset has a maximum accumulation result. There are accumulation results for different possible frequency offsets. The true frequency offset's accumulation result is the maximum accumulation result biggest. The position of the maximum accumulated results indicate the frequency offset.

Figure 4A:
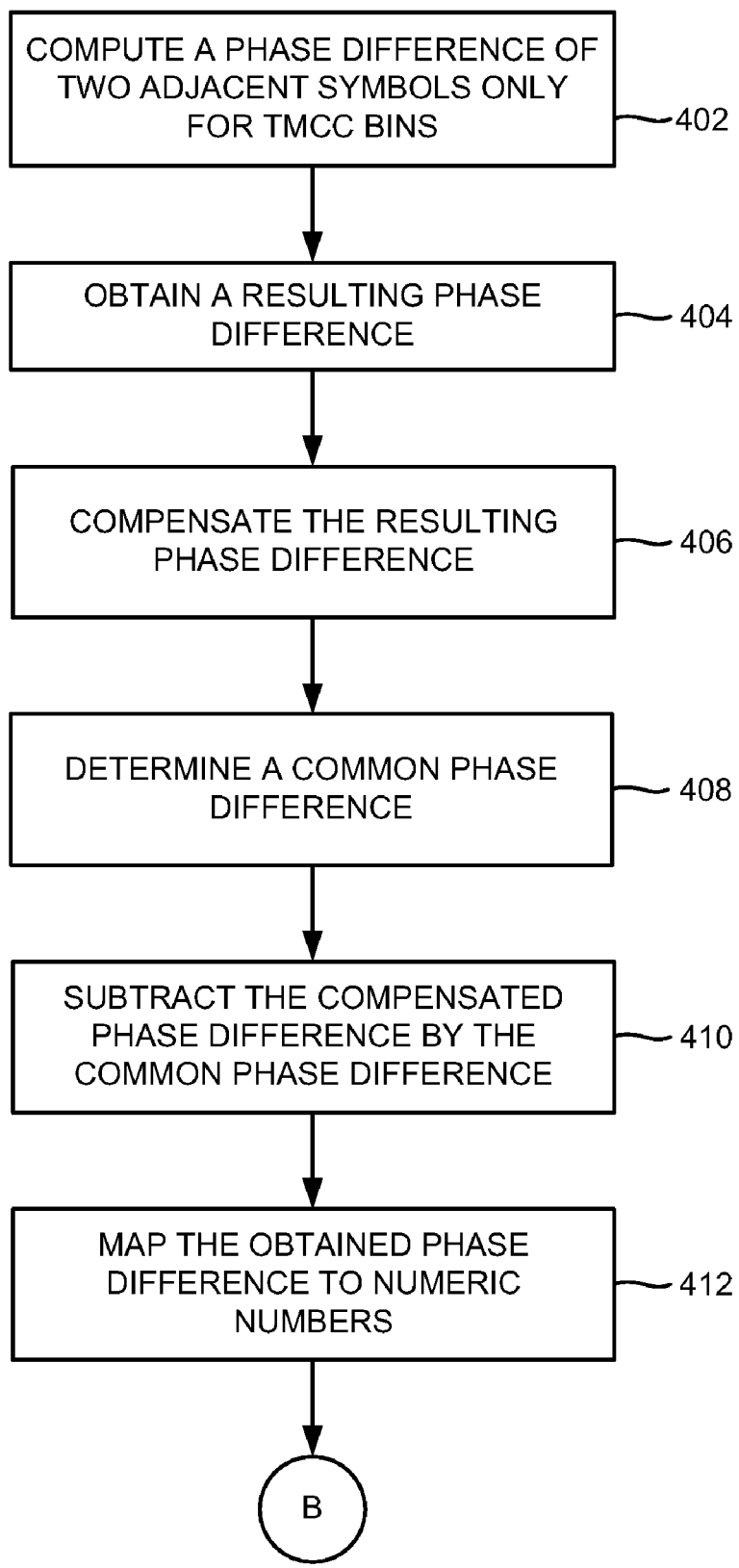
FIGS. 4A and 4B are flow diagrams illustrating a process of coarse frequency offset estimation in an ISDB receiver of transmission mode 3 according to an embodiment herein.
Figure 4B:
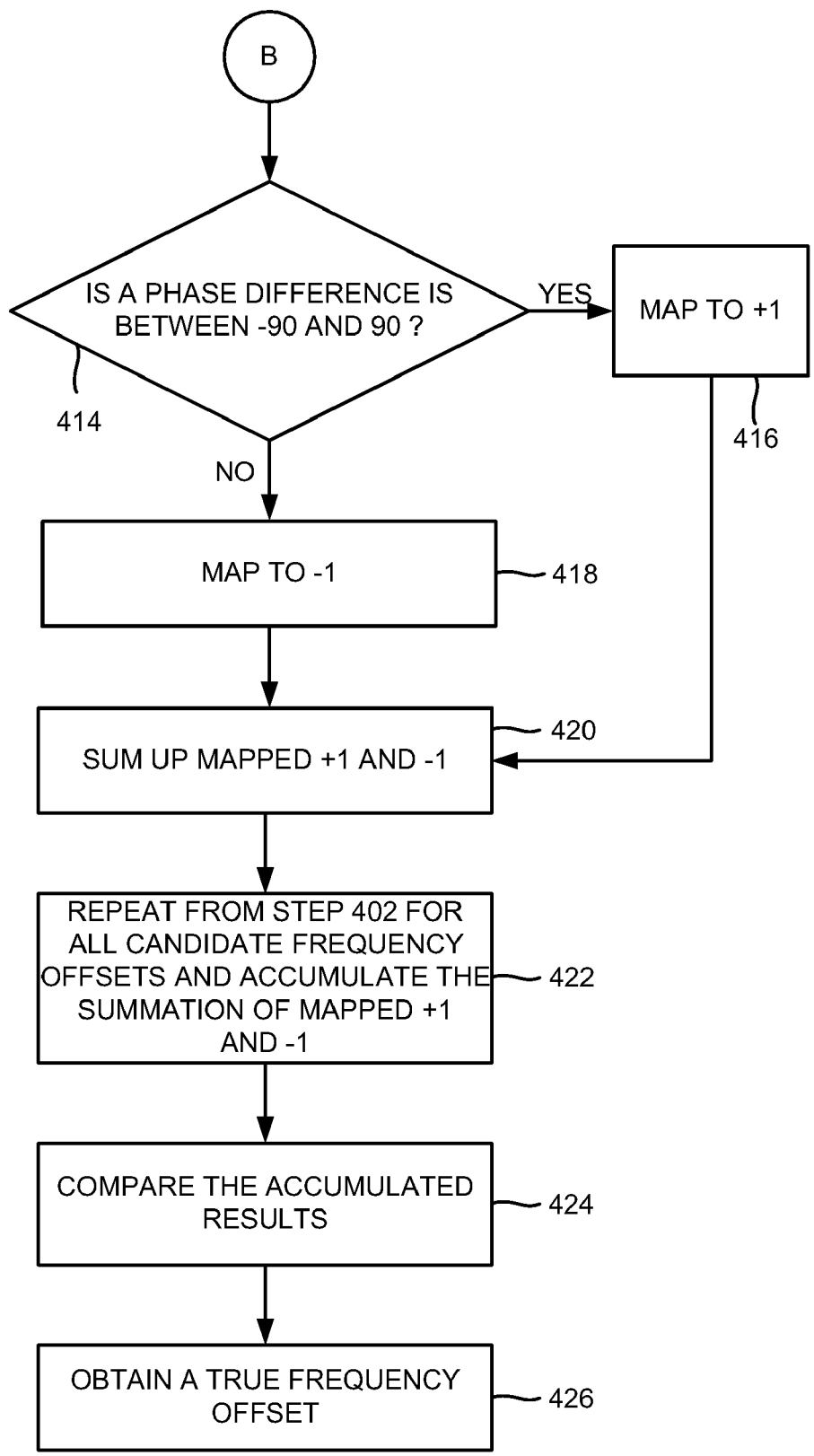

FIGS. 4A and 4B are flow diagrams illustrating a method of estimating coarse frequency offset in an ISDB transmission mode 3 according to an embodiment herein. In step 402, the phase difference of two adjacent symbols for each candidate frequency offset. In step 402, a phase difference of two adjacent symbols is computed only for the corresponding TMCC bins. In step 404, a resulting phase difference is obtained. In step 406, the resulting phase differences are compensated based on the difference between the candidate frequency offset and the FFT center bin. In step 408, a common phase difference that has been transmitted on these TMCC bins is determined based on the phase difference.

In one embodiment, the phase differences for different TMCC bins should be same as all the TMCC bins carry the same TMCC information in ideal case. In step 410, the compensated phase differences are then subtracted by this common decision. The new phase difference is 0 for an ideal case after subtraction. In step 412, the phase differences obtained from the step 410 are mapped to some numeric numbers (either +1 or −1). In step 414, a condition is checked if a phase difference is between −90° and 90°. If the phase difference is between −90° and 90° (Yes), then the phase difference is mapped to +1 in step 416, else (No) the phase difference is mapped to −1 in step 418.

In step 420, the mapped +1 or −1 for all the TMCC and AC bins for that candidate frequency offset are summed up. In step 422, the above steps from 402 are repeated for all candidate frequency offsets and the summation of the mapped +1 or −1 are accumulated. In step 424, the accumulated results are compared for each candidate frequency offset (e.g., a comparator (not shown) may be used to compare the accumulated results for each candidate offset). In step 426, a true frequency offset is obtained. In one embodiment, the true frequency offset has a maximum accumulation result.

Figure 5:
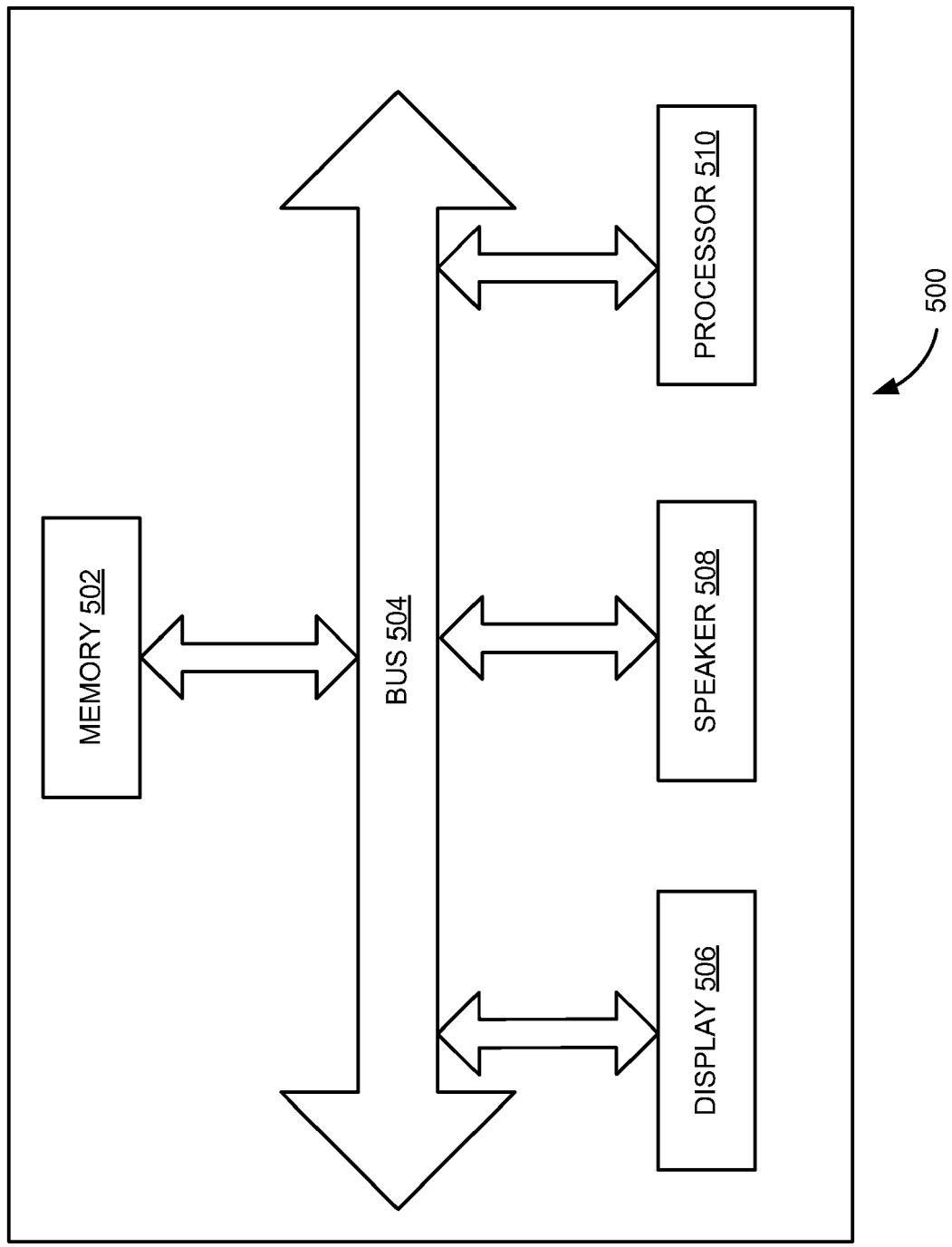
FIG. 5 is a schematic diagram illustrating a mobile television (TV) receiver according to an embodiment herein.

FIG. 5 illustrates an exploded view of a mobile TV receiver 500 having a memory 502 with a computer set of instructions, a bus 504, a display 506, a speaker 508, and a processor 510 capable of processing the set of instructions to perform any one or more of the methodologies herein, according to an embodiment herein. An antenna (not shown) is used to capture OFDM symbols and a modulator (not shown) is used to perform DBPSK modulation. The processor 510 may also enable frequency samples to be consumed in the form of one or more displays 506 or audio for output via speaker and/or earphones 508.

The processor 510 may also carry out the methods described herein and in accordance with the embodiments herein. The received frequency domain sample may also be stored in the memory 502 for future processing or consumption. The memory 502 may also store specific information about the frequency domain sample available in the future or stored from the past. When the sample is selected, the processor 510 may pass information. The information may be passed among functions within mobile TV receiver 500 using the bus 504.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
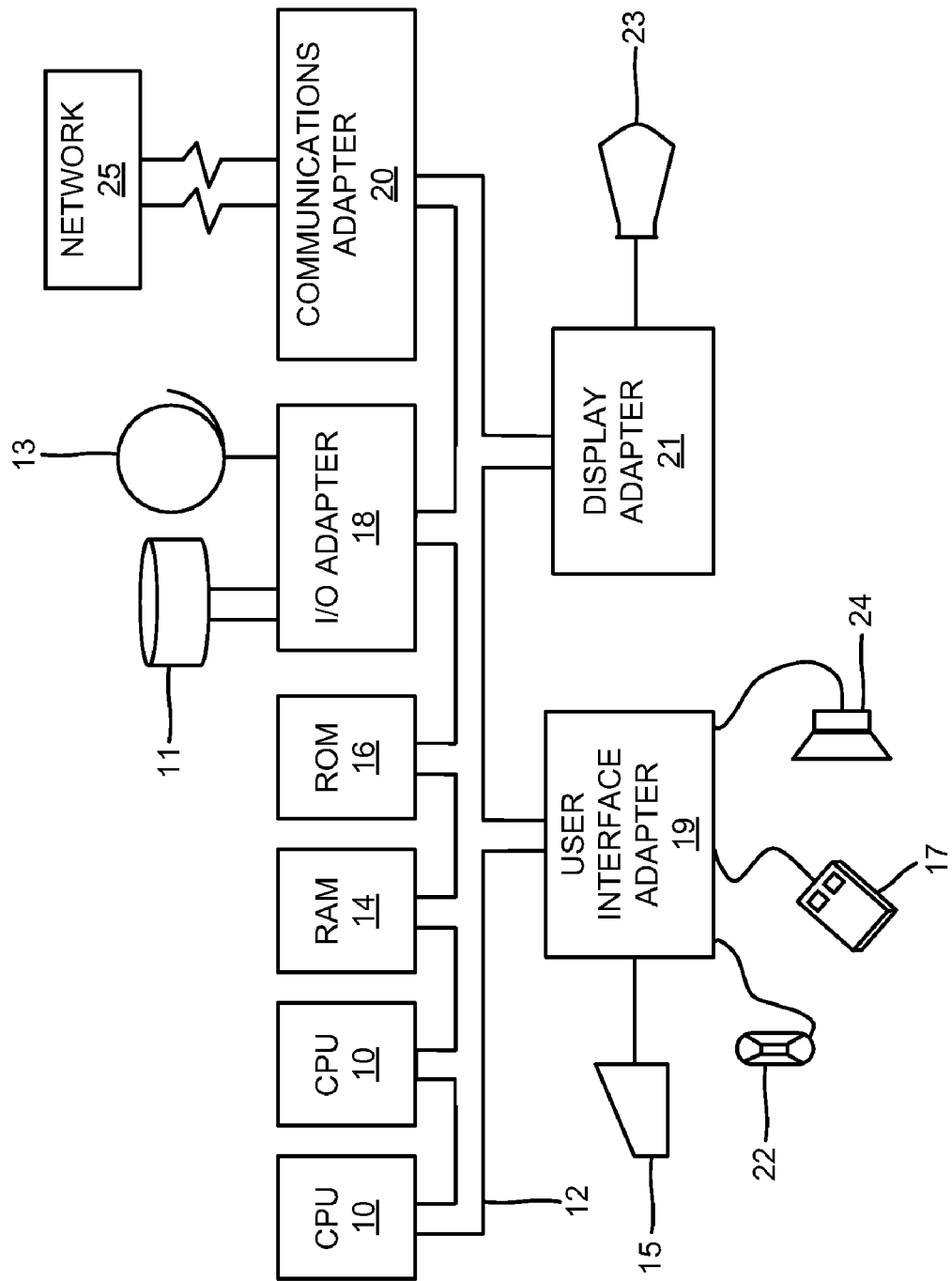
FIG. 6 is a schematic diagram illustrating a computer architecture according to an embodiment herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein provide two alternative coarse frequency offset estimation approaches for ISDB-T and ISDB-TSB receivers by utilizing the unique properties of the TMCC and AC bins to lock the coarse frequency offset: the locations of TMCC and AC bins are unique, and these bins are DBPSK modulated. In an ideal case, the phase across two adjacent symbols on a TMCC bin or AC bin is either 0° or 180°. Thus, the phase difference of TMCC and AC bins can be used to detect their location, and in turn, the coarse frequency offset. In order to have a reliable estimate of the coarse frequency offset before receiving and decoding the received data, an approach which utilizes the phase difference of DBPSK modulated TMCC and AC bins is implemented in the ISDB receivers.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of estimating a coarse frequency offset in a receiver, said method comprising:

providing at least one candidate frequency offset in Orthogonal Frequency-Division Multiplexing (OFDM) symbols having transmission and multiplexing configuration control (TMCC) bins and auxiliary channel (AC) bins;

modulating said TMCC bins and AC bins using differential binary phase shift keying (DBPSK) modulation;

estimating a phase difference between a first symbol and a second symbol for said candidate frequency offset of said TMCC and AC bins to obtain a resulting phase difference;

correcting said resulting phase difference based on a difference between said candidate frequency offset and a Fast Fourier Transform (FFT) center bin to obtain a corrected phase difference;

mapping said corrected phase difference to numeric numbers, wherein said numeric numbers correspond to at least one of +1 or −1; and adding said numeric numbers for said candidate frequency offset to obtain a summation result.

2. The method of claim 1, wherein said +1 correspond to a phase difference between −45° and +45° and between 135° and 225°, and wherein said −1 correspond to a phase difference other than between said −45° and +45° and said 135° and 225°.

3. The method of claim 1, further comprising repeating the estimating process to accumulate said summation result to obtain accumulation results for all candidate frequency offsets.

4. The method of claim 3, further comprising comparing said accumulation results for all candidate frequency offsets to obtain a maximum accumulation result.

5. The method of claim 1, wherein said receiver comprises any of an Integrated Services Digital Broadcasting—Terrestrial (ISDB-T) and an Integrated Services Digital Broadcasting—Terrestrial digital Sound Broadcasting (ISDB-TSB) receiver of transmission mode 2.

6. A method of estimating a coarse frequency offset in a receiver, said method comprising:

providing at least one candidate frequency offset in Orthogonal Frequency-Division Multiplexing (OFDM) symbols having transmission and multiplexing configuration control (TMCC) bins and auxiliary channel (AC) bins;

modulating said TMCC bins and AC bins using differential binary phase shift keying (DBPSK) modulation;

estimating a phase difference between a first symbol and a second symbol for said candidate frequency offset of said TMCC bins to obtain a resulting phase difference;

correcting said resulting phase difference based on a difference between said candidate frequency offset and a Fast Fourier Transform (FFT) center bin to obtain a corrected phase difference;

determining a most likely common phase difference transmitted on said TMCC bins based on said phase difference, wherein said TMCC bins carrying the same information and phase differences for all said TMCC bins are the same;

subtracting said corrected phase difference by said common phase difference to obtain a new phase difference, wherein said new phase difference is zero;

mapping said corrected phase difference to numeric numbers, wherein said numeric numbers correspond to at least one of +1 or −1; and adding said numeric numbers for said candidate frequency offset for all said TMCC bins and said AC bins to obtain a summation result.

7. The method of claim 6, wherein said +1 correspond to a phase difference between −90° and +90°, and wherein said −1 correspond to a phase difference other than between said −90° and +90°.

8. The method of claim 6, further comprising repeating the estimating process to accumulate said summation result to obtain accumulation results for all candidate frequency offsets.

9. The method of claim 8, further comprising comparing said accumulation results for all said candidate frequency offset to obtain a maximum accumulation result.

10. The method of claim 6, wherein said receiver comprises any of an Integrated Services Digital Broadcasting—Terrestrial (ISDB-T) and an Integrated Services Digital Broadcasting—Terrestrial digital Sound Broadcasting (ISDB-TSB) receiver of transmission mode 3 with high Doppler and noisy channels.

11. An Integrated Services Digital Broadcasting (ISDB) receiver that estimates a coarse frequency offset comprising:
- means for capturing at least one candidate frequency offset in Orthogonal Frequency-Division Multiplexing (OFDM) symbols having transmission and multiplexing configuration control (TMCC) bins and auxiliary channel (AC) bins;
- means for modulating said TMCC bins and AC bins using differential binary phase shift keying (DBPSK) modulation;
- a memory unit comprising a computer program set of instructions;
- a display unit operatively connected to said memory unit; and
- a processor adapted to execute said computer program set of instructions, wherein said processor:
  - estimates a phase difference between a first symbol and a second symbol for said candidate frequency offset of said TMCC and AC bins to obtain a resulting phase difference;
  - corrects said resulting phase difference based on a difference between said candidate frequency offset and a Fast Fourier Transform (FFT) center bin to obtain a corrected phase difference;
  - maps said corrected phase difference to numeric numbers, wherein said numeric numbers correspond to at least one of +1 or −1; and
  - adds said numeric numbers for said candidate frequency offset to obtain a summation result.

12. The receiver of claim 11, wherein said +1 correspond to a phase difference between −45° and +45° and between 135° and 225°, and wherein said −1 correspond to a phase difference other than between said −45° and +45° and said 135° and 225°.

13. The receiver of claim 11, wherein said processor repeats the estimating process to accumulate said summation result to obtain accumulation results for all candidate frequency offsets.

14. The receiver of claim 13, wherein said processor compares said accumulation results for all candidate frequency offsets to obtain a maximum accumulation result.

15. The receiver of claim 11, wherein said receiver comprises any of an Integrated Services Digital Broadcasting—Terrestrial (ISDB-T) and an Integrated Services Digital Broadcasting—Terrestrial digital Sound Broadcasting (ISDB-TSB) receiver of transmission mode 2.

16. The receiver of claim 11, wherein said processor determines a most likely common phase difference transmitted on said TMCC bins based on said phase difference, wherein said TMCC bins carrying the same information and phase differences for all said TMCC bins are the same.

17. The receiver of claim 16, wherein said processor subtracts said corrected phase difference by said common phase difference to obtain a new phase difference, wherein said new phase difference is zero.

18. The receiver of claim 17, wherein said processor adds said numeric numbers for said candidate frequency offset for all said TMCC bins and said AC bins to obtain a summation result.

19. The receiver of claim 18, wherein said +1 correspond to a phase difference between −90° and +90°, and wherein said −1 correspond to a phase difference other than between said −90° and +90°.

20. The receiver of claim 11, wherein said receiver comprises any of an Integrated Services Digital Broadcasting—Terrestrial (ISDB-T) and an Integrated Services Digital Broadcasting—Terrestrial digital Sound Broadcasting (ISDB-TSB) receiver of transmission mode 3 with high Doppler and noisy channels.

* * * * *